March 21, 1939. T. M. HILL 2,151,383
CLOSURE
Filed Nov. 29, 1935
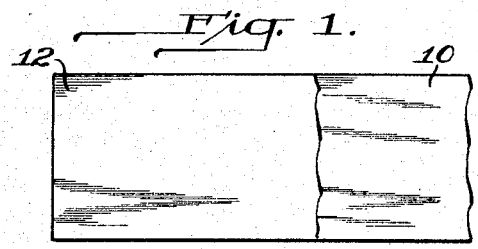
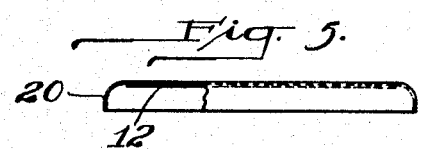
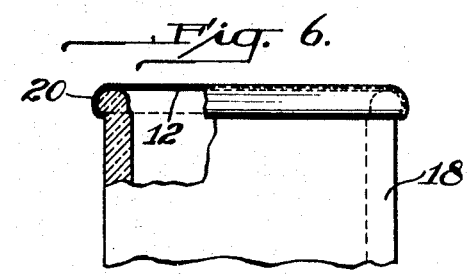
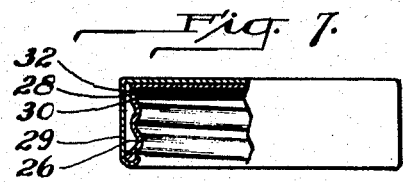
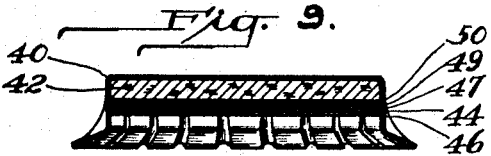
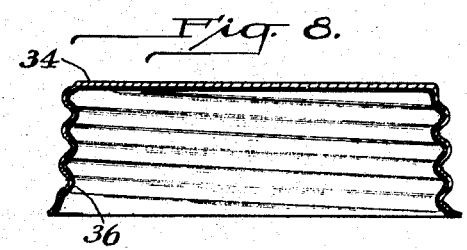
INVENTOR.
THOMAS MORLEY HILL.
BY L. E. Webster
ATTORNEY.

Patented Mar. 21, 1939

2,151,383

UNITED STATES PATENT OFFICE 2,151,383

CLOSURE

Thomas Morley Hill, New Kensington, Pa., assignor to Aluminum Company of America, Pittsburgh, Pa., a corporation of Pennsylvania Application November 29, 1935, Serial No. 52,076

1 Claim. (Cl. 215—40)

This invention relates to closure material for container of edible products and the like. It relates especially to container closures and closure liners of aluminum foil adapted for use in contact with edible and potable products containing aluminum-corroding ingredients.

As is generally known, metal foils have found extensive and increasing use in the packaging of many articles and substances. This is particularly true with regard to substances intended for human consumption, including both edible and potable products, which for the sake of brevity will be sometimes referred to herein as edible products. It is also known that aluminum foil is preferred over other metal foils for many packaging applications because of its strength, light weight, good appearance, low cost, and other desirable characteristics. It has been recognized, however, that aluminum foil is not always satisfactory for use in contact with foodstuffs and like materials intended for human consumption because of the aluminum-corroding ingredients often contained in such materials. These aluminum-corroding ingredients include some mineral salts, such as sodium chloride in the presence of moisture, acids such as lactic acid, acetic acid, and other weak acids under certain conditions, and some alkaline compounds.

Because of the difficulty caused by these aluminum-corroding ingredients, it has been proposed to protect the aluminum foil, or to prevent its direct contact with the material containing these corrosive ingredients, by a protective layer or coating attached or applied thereto. Various materials have been proposed for this purpose, including plain and variously impregnated papers, certain varnishes and lacquers, lubricants, and some resins, such as shellac. None of the coating materials heretofore proposed have been found satisfactory in practice, however, and even with the best of these coating materials the protective life of aluminum foil packaging materials has not been sufficiently long under severe conditions. Prior to my invention, difficulties were still encountered with aluminum foil wrappers for cheeses and butters, and closures for mayonnaise and other edible products, as well as with the foil linings or facings of closures for beverage containers and the like, due to the penetrating action of the aluminum-corroding ingredients of such products.

I have found, however, that if aluminum foil closure materials are provided with a coating containing, as a principal ingredient, polymerized vinyl ester resins, the difficulties heretofore encountered in the use of aluminum foil as a packaging material for edible products containing aluminum-corroding ingredients are substantially completely overcome. By the use of such a coating or lacquer of suitable vinyl compounds, the preservative life of the foil is extended and made materially greater than that of aluminum foil coated with ordinary lacquers or varnishes, or other coating materials heretofore proposed. As a result, aluminum foil is now accepted as a packaging material having many applications for which it was not heretofore considered suitable. The preferred coating has the further advantage of reducing or eliminating any tendency of the foil to adhere to packaged foodstuffs and the like with which it comes in contact. This vinylite coating is also substantially inert, odorless and tasteless, and does not impart any undesirable odor or taste to the products with which it comes in contact.

In addition to its suitability for use as a wrapping material for butter, cheese, and other substantially solid foodstuffs, aluminum foil with my preferred coating of vinyl compounds has numerous other applications in packaging edible products. For example, aluminum foil of suitable thickness and provided with this coating is well adapted for use in caps or closures for glasses and wide-mouthed bottles or jars, such as are used in the marketing of milk, cottage cheese, orange juice, mayonnaise, horse-radish, and other liquid or semi-liquid products. Several forms of closures of this general type are known in the art, representative examples being disclosed in U. S. Patents 1,796,728 and 1,796,729, for example.

A similar application of my vinylite coated or lacquered foil is in the lining material for closures, caps, or seals of various types which, because of the service conditions encountered or for other reasons, must be heavier or stronger or more tightly attached than is possible with closures made of a single layer of foil. Several types of closures for such purposes are also known in the art, some of the better known examples being the screw type, the lug type and the crown type of cap or seal. It has already been proposed to provide closures of these types with foil lining material, which is usually attached by means of a suitable adhesive to the resilient sealing pad or cushion mounted on the interior of a metal shell. The foil lining or facing may also be provided with a paper backing if desired, as disclosed in the Koch Patent 1,238,156, for example. It has also been suggested to provide such foil linings with a protective coating. For example, in U. S.

Patent 1,867,637 to Warth, it is proposed to use an interior facing of tinfoil, or preferably aluminum foil, on crown caps, and to coat the foil with a varnish to make it resistant to citric acid, lactic acid, acetic acid, sodium chloride and other mineral salts, alkaline compounds, and other corrosive ingredients of beverages and the like. When this facing is used with caps of the crown type, it is usually applied in the form of a center spot, which is smaller in diameter than the cushion material, such as cork, composition cork, newsboard or the like, in the cap. It is also stated, however, that a similar facing material may be applied to caps of other types, such as screw or lug caps, and that in such caps, the foil facing or lining material is not necessarily smaller in diameter than the cushion. In all cases it is said to be preferable to attach the foil with an adhesive having thermoplastic properties, and several suitable adhesives are enumerated.

The protective varnish coatings proposed for this purpose in this Warth patent and elsewhere have been found unsatisfactory in most instances of exposure to severe corrosive conditions, but if the aluminum foil used as a facing or lining for the cushion material in the various types of seals or caps is given my preferred coating consisting principally of vinyl ester resins, it is made resistant to substantially all of the known corrosive ingredients encountered in this type of packing. In this application, as well as in the others previously mentioned, the coating may be so thin that it is difficult to detect, and that the foil does not lose its identity or desirable characteristics, thereby attaining satisfactory results. A suitable coating may be, and in most instances is preferably, less than 0.001 inch in thickness.

The vinyl esters which I have found to be best suited for application as coatings to closure materials for the various purposes contemplated are vinyl acetate and vinyl chloride, or combinations thereof. These esters, in the polymerized or associated forms known sometimes as "vinylite", are preferably combined with a suitable solvent and, if desired, a small quantity of a plasticizer, such as dibutyl phthalate, to form a solution or lacquer which is applied to the foil.

The vinyl acetate and chloride, when used in combination, may be blended in substantially any desired proportions, and the advantages of my invention will be realized to an appreciable extent irrespective of the particular ratio chosen, although it is preferable in many applications to employ more chloride than acetate. It is, of course, to be understood that while the terms vinyl ester, vinyl chloride and vinyl acetate are frequently employed in this application for the sake of convenience, these terms are not generally intended to refer to the mono-molecular forms of these compounds, but rather to the polymerized or associated forms in which these compounds are found in the vinyl or vinylite resins or gums now available on the market.

As an example by which those skilled in the art may be readily enabled to practice my invention, I have found that a resin consisting of approximately eighty parts vinyl chloride and twenty parts vinyl acetate gives highly satisfactory results. This or any other suitable composition may be dissolved in acetone or other suitable solvent to form a solution containing 37.5 per cent by weight of the vinyl compounds, for example. Before applying the vinyl compound, it is usually preferable to further dilute the solution, using as a final solution, for example, 40 per cent of the described solution containing 37.5 per cent vinyl compounds, 3 per cent of dibutyl phthalate or other plasticizer, and 57 per cent of additional solvent. A satisfactory additional solvent may consist of 50 per cent ethylene dichloride or a suitable ketone and 50 per cent of the monoethyl ether of ethylene glycol. To the resulting solution there may be added, if desired, a small amount of another resin such as paracoumarone resin which, in some instances, improves the adhesion of the coating to the foil.

Other plasticizers, including diamyl phthalate, ethyl abietate, and tri-cresyl phosphate, may be substituted for the dibutyl phthalate previously mentioned. Other solvents may also be substituted, including ketones such as acetone, methyl-ethyl-ketone, and hexone, and xylene, toluene, ethyl acetate, butyl acetate, or suitable mixtures thereof. A further modification, which is useful in many applications, consists in including with the polymerized vinyl compound or compounds some nitrocellulose lacquer. In this modification, the final mixture may consist, for example, of about 32 per cent by weight of a 35 per cent solution of vinyl resin in a ketonic solvent, 5 per cent by weight of wet nitrocellulose of suitable viscosity, preferably of a Saybolt viscosity of 0.5 second to 18 seconds, 3 per cent by weight of dibutyl acetate, and about 60 per cent by weight of a solvent, such as one having a volume composition of 50 per cent toluene, 40 per cent ethyl acetate, and 10 per cent butyl acetate. Larger quantities of nitrocellulose may be used, but I have found that coatings containing the vinyl compounds in higher ratios to the nitrocellulose offer somewhat better protection to the aluminum foil. In any case, of course, vinyl chloride, vinyl acetate, or a mixture of the two, may be used.

The selected solution or lacquer, such as one of those disclosed hereinabove, is brushed, sprayed or applied by rolls or otherwise, to the surface of the foil which is to be protected, and is allowed to dry. Upon drying, it forms a thin, substantially colorless, transparent film having the characteristics of toughness and flexibility and providing effective resistance to attack by the aluminum-corroding ingredients of foodstuffs and beverages. The essential feature of the invention is the provision of aluminum foil closure material having a coating containing, as a principal ingredient, polymerized vinyl esters, with or without the addition of plasticizers, other resins, and/or nitrocellulose.

It will be understood that while in most cases it is preferred to apply the vinyl ester coating only to the side of the foil which is to be in contact with the foodstuff or other packaged product, the coating may, if desired, be applied to both sides. The coating strengthens the foil and eliminates any possible porosity, thus cutting down evaporation losses and oxidation of the packaged material. When the coating is used on both sides, the coating on the outside or side which does not contact the packaged material may serve as an adhesive for attaching the foil to some other material, such as paper, or, in the case of closure caps, the cork or other cushioning material inside of the closure shell.

Other adhesives may supplement or replace the outside vinyl coating for attaching the foil to other objects or materials, and in the case of container closures and some other applications it is usually preferable to employ a thermoplastic adhesive such as gutta percha, pitch, or others which are known to the art. The adhesive should, of course, be only coextensive with the foil when used in spot facing closure liners, and in all cases it should preferably be highly adherent to both the foil and the backing material, and resistant to attack by constituents of the material to be packaged.

It should be understood that the term "foil" is used herein in its ordinary sense to designate light gauge metal products in sheet form. Aluminum foil is available in thicknesses ranging from about 0.00025 inch to 0.006 inch or more, and the particular thickness employed varies according to the application. For example, the lighter foils having a thickness of 0.00035 inch or less are often used for candy wrappers, somewhat heavier foils having a thickness of about 0.001 inch or 0.002 are usually employed as closure liners, and still heavier foils having a thickness of about 0.003 to 0.004 are usually used for foil closures. My invention is not dependent on the use of any particular thickness of foil, and is applicable regardless of thickness and regardless of whether paper or other backing is used on the foil.

In order that my invention may be more readily understood, it will now be further described with reference to the accompanying drawing, in which:

Figs. 1 and 2 are top views of closure materials embodying my invention;

Figs. 3 and 4 are side views of the materials shown in Figs. 1 and 2 respectively; and Figs. 5 to 10 inclusive are side views in section, or with sections broken away, illustrating some of the closures contemplated by my invention.

Figs. 1 and 3 show one of the simpler embodiments or forms of closure material contemplated by my invention, consisting of a layer of foil 10 having on one surface thereof a thin layer 12 of polymerized vinyl ester or vinyl resin lacquer. This material is suitable for use in wrapping solid foodstuffs and other products, as well as for application in closures for containers of edible products and the like.

Figs. 2 and 4 show a laminated closure material embodying my invention, in which the layer of aluminum foil 10 having a surface coating 12 of vinyl resin lacquer is attached by means of a layer of adhesive 14 to suitable paper or other backing material 16. This composite closure material may be used similarly to the material illustrated in Figs. 1 and 3, and both materials are, of course, employed with the vinyl coating or lacquer 12 disposed toward the edible products, or other materials to be packaged, which contain aluminum-corroding ingredients.

Fig. 5 illustrates a form of aluminum foil closure adapted for use on milk bottles and the like, and Fig. 6 illustrates a somewhat similar form of closure applied to a wide-mouthed glass or jar 18. In both instances, the closure consists of a layer of foil 20 shaped for attachment to a container and having on its inner surface a coating 12 of suitable vinyl compounds.

Figs. 7 and 8 illustrate forms of screw caps or closures embodying my invention. In the form shown in Fig. 7 the metal shell of the cap consists of an outer part 29 and an inner part 26. The top of the inner shell is protected by a lining or facing of aluminum foil 28 having a coating 30 of vinyl resin lacquer, the foil being attached to the seal by a stratum of suitable adhesive 32 which is preferably thermoplastic. The screw cap illustrated in Fig. 8 has a shell 34 of aluminum or other suitable metal which is completely coated on its inner surface with a layer 36 of vinyl resin lacquer. This coating may be applied to the metal before the cap is formed, or the cap may be formed from plain aluminum foil or sheet, for example, and then coated on part or all of its inner surface by dipping, spraying or otherwise.

Figs. 9 and 10 illustrate the application of my invention to seals or closures of the crown type. Such closures ordinarily consist of a metal shell 40 enclosing a sealing pad or cushion which usually has a relatively thick and compressible base 42 of cork, composite cork, or other suitable resilient material. This cushion or pad is provided, in accordance with my invention, with a lining or facing of aluminum foil 44 having on its exposed inner surface a protective sealing coating or film 46 of vinyl resin lacquer or other suitable vinyl compound. In the embodiment shown in Fig. 10, the foil constitutes a spot facing smaller in diameter than the sealing pad or cushion 42 and is attached thereto by a layer 48 of suitable adhesive which is preferably thermoplastic. In the embodiment shown in Fig. 9, however, the foil facing extends to substantially the full diameter of the sealing cushion 42 and is attached by a layer of adhesive 47 to a backing of paper or the like 49 which, in turn, is attached to the sealing cushion by a stratum of suitable adhesive 50. Somewhat thinner foil may, of course, be employed when a suitable backing is provided.

It will be understood that the thickness of the foil and the coating, as well as of the adhesive stratum, are exaggerated in most of the views of the drawing.

Although certain specific embodiments of my invention have been described hereinabove by way of illustration, it is to be understood that my invention is not limited thereto but may be otherwise practiced and embodied within the scope of the appended claim.

I claim:

A container closure including a sealing cushion comprising a base of relatively thick and compressible substance, a facing of foil on said base and affixed thereto by means of a stratum of thermoplastic adhesive, and a protective sealing film of vinyl resin lacquer on the exposed surface of said facing, said film being of such thinness that the foil does not lose its identity as a sealing means.

THOMAS MORLEY HILL.